US 12,393,756 B2

(12) United States Patent
Sinclair et al.

(10) Patent No.: US 12,393,756 B2
(45) Date of Patent: *Aug. 19, 2025

(54) METHODS AND APPARATUS FOR PROFILE-GUIDED OPTIMIZATION OF INTEGRATED CIRCUITS

(71) Applicant: Intel Corporation, Santa Clara, CA (US)

(72) Inventors: Byron Sinclair, Toronto (CA); John Freeman, Toronto (CA)

(73) Assignee: Altera Corporation, San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/311,886

(22) Filed: May 3, 2023

(65) Prior Publication Data

US 2023/0342531 A1 Oct. 26, 2023

Related U.S. Application Data

(63) Continuation of application No. 15/721,195, filed on Sep. 29, 2017, now Pat. No. 11,675,948.

(51) Int. Cl.
*G06F 9/44* (2018.01)
*G06F 8/41* (2018.01)
(Continued)

(52) U.S. Cl.
CPC .............. *G06F 30/343* (2020.01); *G06F 8/41* (2013.01); *G06F 8/4434* (2013.01); *G06F 30/20* (2020.01);
(Continued)

(58) Field of Classification Search
CPC ........ G06F 30/343; G06F 30/20; G06F 30/39; G06F 8/41; G06F 8/4434; G06F 8/65; G06F 2111/04; G06F 2111/06
See application file for complete search history.

(56) References Cited

U.S. PATENT DOCUMENTS 6,477,683 B1 11/2002 Killian et al.
7,072,818 B1 7/2006 Beardslee et al.
(Continued)

FOREIGN PATENT DOCUMENTS

JP 2009015867 A * 1/2009 .............. G06F 11/28

OTHER PUBLICATIONS

Francis B. Moreira, A dynamic block-level execution profiler, 2016, pp. 1-14. https://web.inf.ufpr.br/mazalves/wp-content/uploads/sites/13/2019/10/parco2016.pdf (Year: 2016).*

(Continued)

*Primary Examiner* — Mongbao Nguyen
(74) *Attorney, Agent, or Firm* — Fletcher Yoder, P.C.

(57) ABSTRACT

Methods and apparatus for performing profile-guided optimization of integrated circuit hardware are provided. Circuit design tools may receive a source code and compile the source code to generate a hardware description. The hardware description may include profiling blocks configured to measure useful information required for optimization. The hardware description may then be simulated to gather profiling data. The circuit design tools may then analyze the gathered profiling data to identify additional opportunities for hardware optimization. The source code may then be modified based on the analysis of the profiling data to produce a smaller and faster hardware that is better suited to the application.

61 Claims, 8 Drawing Sheets

(51) Int. Cl.
*G06F 9/445* (2018.01)
*G06F 9/455* (2018.01)
*G06F 30/20* (2020.01)
*G06F 30/343* (2020.01)
*G06F 30/39* (2020.01)
*G06F 8/65* (2018.01)
*G06F 111/04* (2020.01)
*G06F 111/06* (2020.01)
*G06F 117/08* (2020.01)

(52) U.S. Cl.
CPC ............ *G06F 30/39* (2020.01); *G06F 8/65* (2013.01); *G06F 2111/04* (2020.01); *G06F 2111/06* (2020.01); *G06F 2117/08* (2020.01)

(56) References Cited

U.S. PATENT DOCUMENTS

| | | | |
|---|---|---|---|
| 7,076,415 B1 | 7/2006 | Demler et al. | |
| 7,168,059 B2 | 1/2007 | Bowyer et al. | |
| 7,237,214 B1* | 6/2007 | Pandey | G06F 30/327 716/131 |
| 7,412,369 B1 | 8/2008 | Gupta | |
| 7,813,912 B1 | 10/2010 | Sundararajan | |
| 8,356,266 B1 | 1/2013 | Ou et al. | |
| 8,640,064 B1* | 1/2014 | Liddell | G06F 30/33 716/106 |
| 8,694,947 B1* | 4/2014 | Venkataramani | G06F 30/34 716/132 |
| 9,348,566 B1 | 5/2016 | Moseley et al. | |
| 9,442,696 B1 | 9/2016 | Koh et al. | |
| 9,529,950 B1 | 12/2016 | Sadooghi-Alvandi et al. | |
| 9,569,179 B1 | 2/2017 | Kachmar et al. | |
| 10,078,717 B1* | 9/2018 | Venkataramani | G06F 30/3315 |
| 10,152,566 B1 | 12/2018 | Nagarandal et al. | |
| 10,216,254 B1* | 2/2019 | Rao | G06F 11/3656 |
| 10,216,877 B2 | 2/2019 | Vijayendra et al. | |
| 10,380,313 B1 | 8/2019 | Schumacher et al. | |
| 10,489,543 B1* | 11/2019 | Lysaght | G06F 30/331 |
| 10,558,437 B1 | 2/2020 | Denisenko | |
| 10,650,174 B1 | 5/2020 | Wilmot et al. | |
| 2003/0140337 A1 | 7/2003 | Aubury | |
| 2004/0015806 A1* | 1/2004 | Frank | G06F 30/398 716/139 |
| 2004/0019859 A1 | 1/2004 | Ravi et al. | |
| 2004/0088666 A1 | 5/2004 | Poznanovic et al. | |
| 2004/0093601 A1 | 5/2004 | Master et al. | |
| 2006/0259878 A1 | 11/2006 | Killian et al. | |
| 2009/0249262 A1 | 10/2009 | Kato et al. | |
| 2010/0268523 A1 | 10/2010 | Dhanwada et al. | |
| 2010/0324878 A1 | 12/2010 | Lee et al. | |
| 2012/0144376 A1 | 6/2012 | Eijdhoven et al. | |
| 2012/0185809 A1 | 7/2012 | Kadiyala et al. | |
| 2012/0185820 A1 | 7/2012 | Kadiyala et al. | |
| 2012/0330637 A1* | 12/2012 | Krautz | G06F 30/3323 703/14 |
| 2013/0125097 A1 | 5/2013 | Ebcioglu et al. | |
| 2016/0321390 A1 | 11/2016 | Bozman et al. | |
| 2018/0074715 A1 | 3/2018 | Farmahini-Farahani et al. | |
| 2018/0089352 A1* | 3/2018 | Vijayendra | G06F 30/30 |
| 2018/0101624 A1 | 4/2018 | Dhar et al. | |
| 2018/0146157 A1* | 5/2018 | Karpinsky | H04N 7/188 |
| 2018/0225096 A1* | 8/2018 | Mishra | G06F 8/75 |
| 2019/0113572 A1* | 4/2019 | Bose | G06F 30/327 |

OTHER PUBLICATIONS

JP (JP 2009015867 A), 2009, pp. 1-56 (Year: 2009).*
George Kornaros, An Automated Infrastructure for Real-Time Monitoring of Multi-Core Systems-on-Chip, 2012, pp. 1-6. https://ieeexplore.ieee.org/stamp/stamp.jsp?tp=&arnumber=6219025 (Year: 2012).*
Jeffrey Goeders, Signal-Tracing Techniques for In-System FPGA Debugging of High-Level Synthesis Circuits, 2017, pp. 83-95. https://ieeexplore.ieee.org/stamp/stamp.jsp?tp=&arnumber=7466842 (Year: 2017).*
Felix Friedrich, A Compute Model for Generating High Performance Computing SoCs on Hybrid Systems with FPGAs, 2016, pp. 12-23. https://ieeexplore.ieee.org/stamp/stamp.jsp?tp=&arnumber=7584276 (Year: 2016).*
Justin L. Tripp, Trident: From High-Level Language to Hardware Circuitry, 2007, pp. 28-37. https://ieeexplore.ieee.org/stamp/stamp.jsp?tp=&arnumber=4133993 (Year: 2007).*
Carsten Gremzow, Compiled Low-Level Virtual Instruction Set Simulation and Profiling for Code Partitioning and ASIP-Synthesis in Hardware/Software Co-Design, 2007, pp. 741-747. https://dl.acm.org/doi/pdf/10.5555/1357910.1358025 (Year: 2007).*
Heiko Hubert, Profiling-Based Hardware/Software Co-Exploration for the Design of Video Coding Architectures, 2009, pp. 1-12. https://ieeexplore.ieee.org/stamp/stamp.jsp?tp=&arnumber=5229346 (Year: 2009).
Francis B. Moreira, Profiling and Optimizing Micro-Architecture Bottlenecks on the Hardware Level, 2014, pp. 1-8. http://euler.ecs.umass.edu/research/madnk-SBAC-2014.pdf (Year: 2014).
Neil E. Johnson, Code size optimization for embedded processors, 2004, pp. 1-159. https://www.cl.cam.ac.uk/techreports/UCAM-CL-TR-607.pdf (Year: 2004).
Morteza Mohajjel Kafshdooz, A Compile-Time Optimization Method for WCET Reduction in Real-Time Embedded Systems through Block Formation, 2015, pp. 1-25. https://dl.acm.org/doi/pdf/10.1145/2845083 (Year: 2015).
Narasinga Rao Miniskar, Fast Cycle-Accurate Compile Based Simulator for Reconfigurable Processor, 2012, pp. 1-4. https://ieeexplore.ieee.org/stamp/stamp.jsp?tp=&arnumber=8050318 (Year: 2012).
Francis B. Moreira, Profiling and Reducing Micro-Architecture Bottlenecks at the Hardware Level, 2014, pp. 1-8. https://ieeexplore.ieee.org/document/6970668 (Year: 2014).
Rajendra Patel, A Survey of Embedded Software Profiling Methodologies, 2011, pp. 1-22. https://arxiv.org/ftp/arxiv/papers/1312/1312.2949.pdf (Year: 2011).
Carsten Gremzow, Compiled Low-Level Virtual Instruction Set Simulation and Profiling for Code Partitioning and ASIP-Synthesis in Hardware/Software Co-Design, 2007, pp. 741-747. https://llvm.org/pubs/2007-07-SCSC-Simulation.pdf (Year: 2007).
Skyler Windh, High-Level Language Tools for Reconfigurable Computing, 2015, pp. 390-406. https://ieeexplore.ieee.org/stamp/stamp.jsp?tp=&arnumber=7086410&isnumber=7086369 (Year: 2015).

* cited by examiner

METHODS AND APPARATUS FOR PROFILE-GUIDED OPTIMIZATION OF INTEGRATED CIRCUITS

BACKGROUND

This relates to integrated circuits and, more particularly, to improving the design of programmable integrated circuits.

Programmable integrated circuits are a type of integrated circuit that can be programmed by a user to implement a custom logic function. In a typical scenario, a logic designer uses computer-aided design tools to design a custom logic circuit based on a source code produced by the user. When the design process is complete, the computer-aided design tools generate configuration data. The configuration data is used to configure the devices to perform the functions of the custom logic circuit.

In general, logic resources on a programmable integrated circuit are allocated in the design phase to provide proper functionality. In practice, a large portion of the logic resources on a configured programmable integrated circuit device can be underutilized. For example, a branch condition in the source code may direct the programmable device to activate a first set of circuits if the branch condition is true or to activate a second set of circuits if the branch condition is false. The computer-aided design tools typically optimize both the first and second sets of circuits in the design phase. During runtime, however, the branch condition might be met more than 90% of the time. Allocating the same amount resources to both the first and second sets of circuits in such scenarios will tend to produce a bulkier hardware architecture with suboptimal performance.

It is within this context that the embodiments described herein arise.

DETAILED DESCRIPTION

Embodiments of the present invention relate to methods and apparatus for performing profile-guided optimization of hardware using high-level design. A user provides a software application code to a design compiler. The design compiler generates a hardware description from the application code. The design compiler may use heuristic algorithms to identify potentially useful information required for more aggressive hardware optimizations.

Non-intrusive profilers may be inserted into the hardware description to measure the useful information requested by the compiler. The hardware description may then be simulated, so the profilers can obtain profiling data. The profiling data may be used to identify opportunities for hardware optimization, which can be selectively approved. This process can be iteratively performed to generate faster hardware that is better suited for the specific application.

It will be recognized by one skilled in the art, that the present exemplary embodiments may be practiced without some or all of these specific details. In other instances, well-known operations have not been described in detail in order not to unnecessarily obscure the present embodiments.

Figure 1:
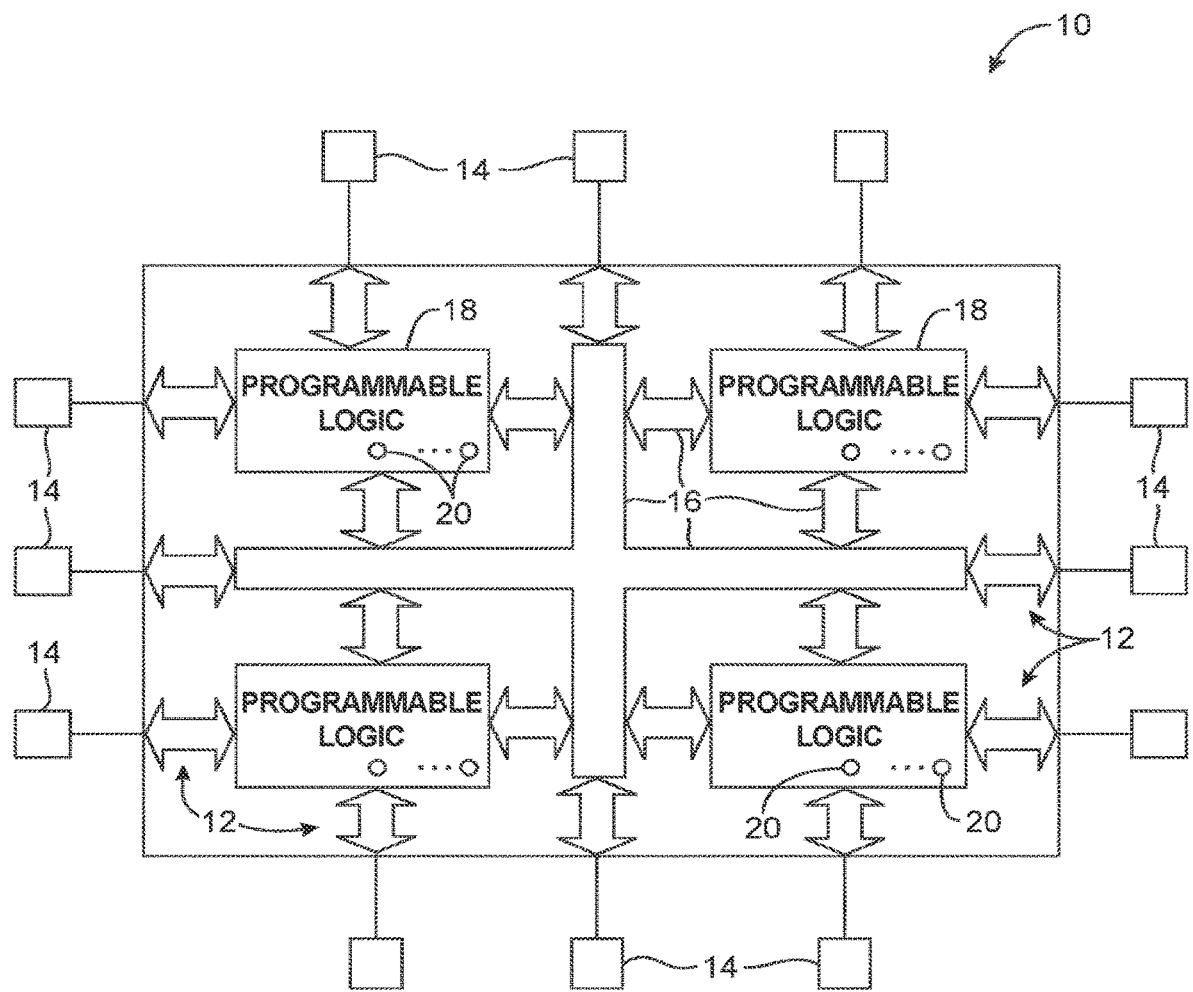
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
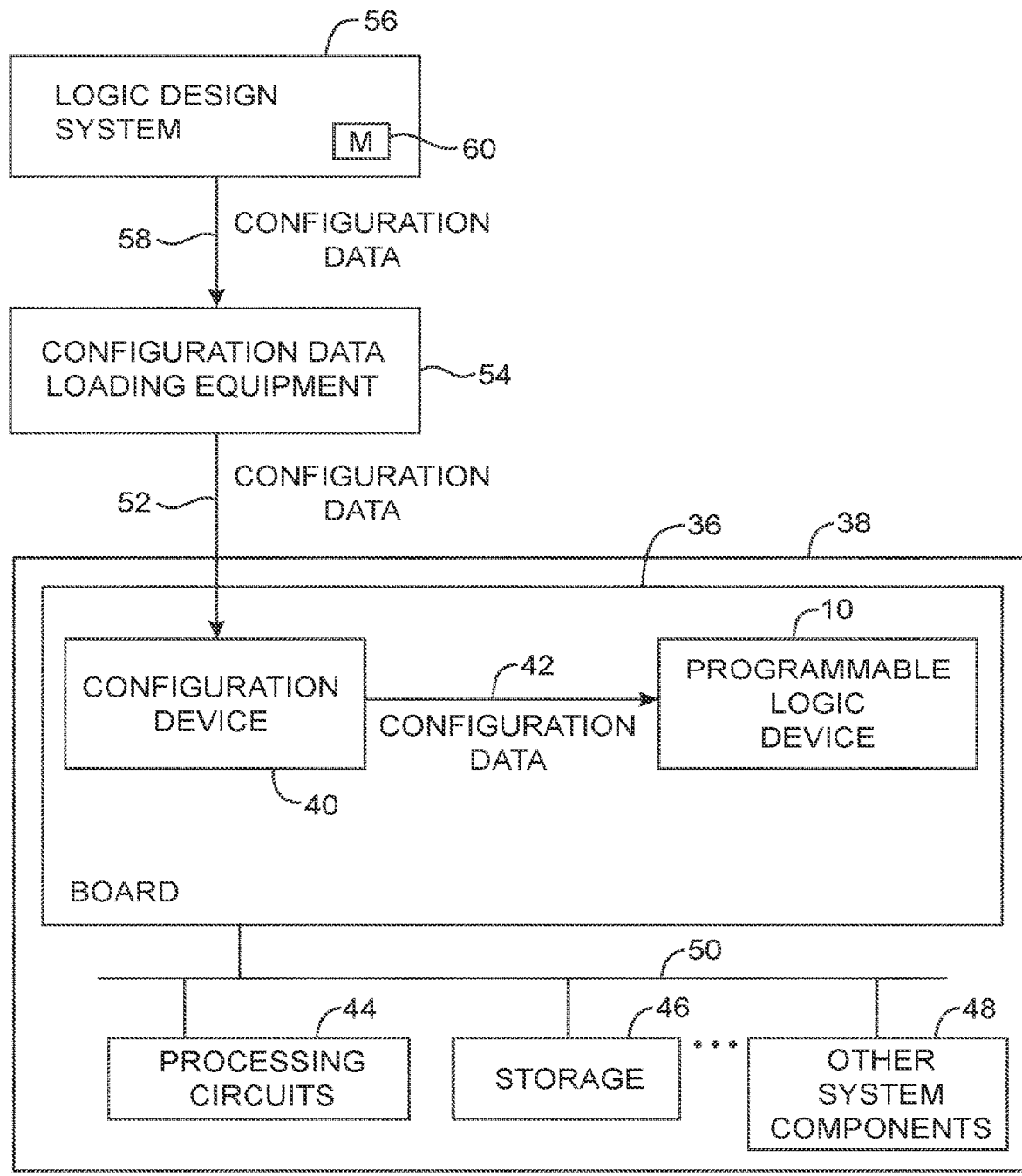
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data (sometimes referred to as a configuration bit stream) for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. System 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

Figure 3:
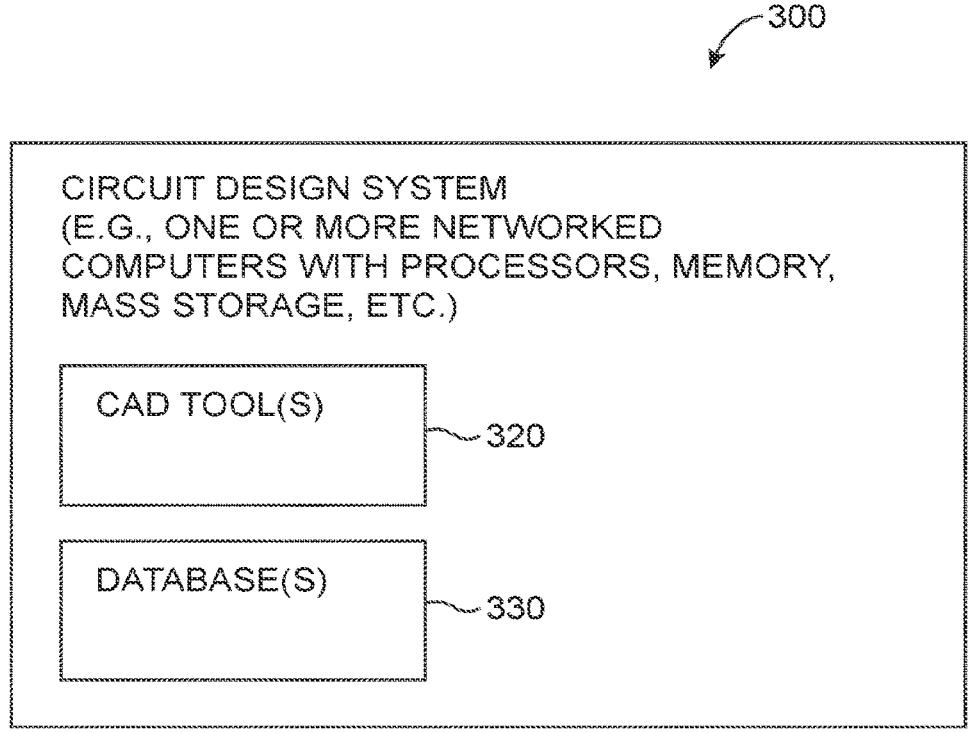
FIG. 3 is a diagram of a circuit design system that can be used to design integrated circuits in accordance with an embodiment.

An illustrative circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips such as read-only memory (ROM), non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods or processes. When performing these processes, the computing equipment is configured to implement the functions of circuit design system 300.

Computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
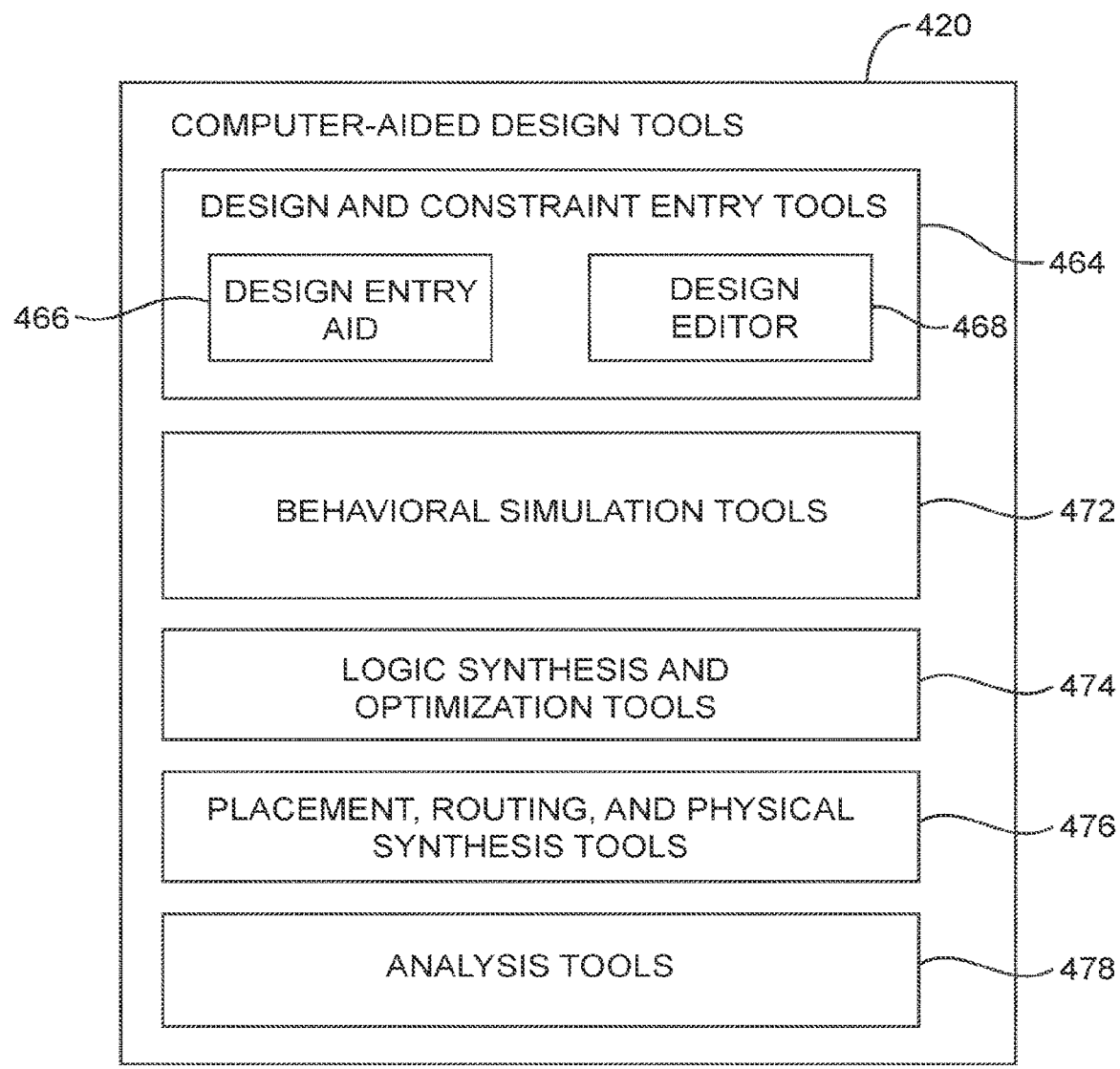
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design software application code to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL, SystemC, C/C++, just to name a few. The designer of the integrated circuit design can enter the circuit design by writing the application code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
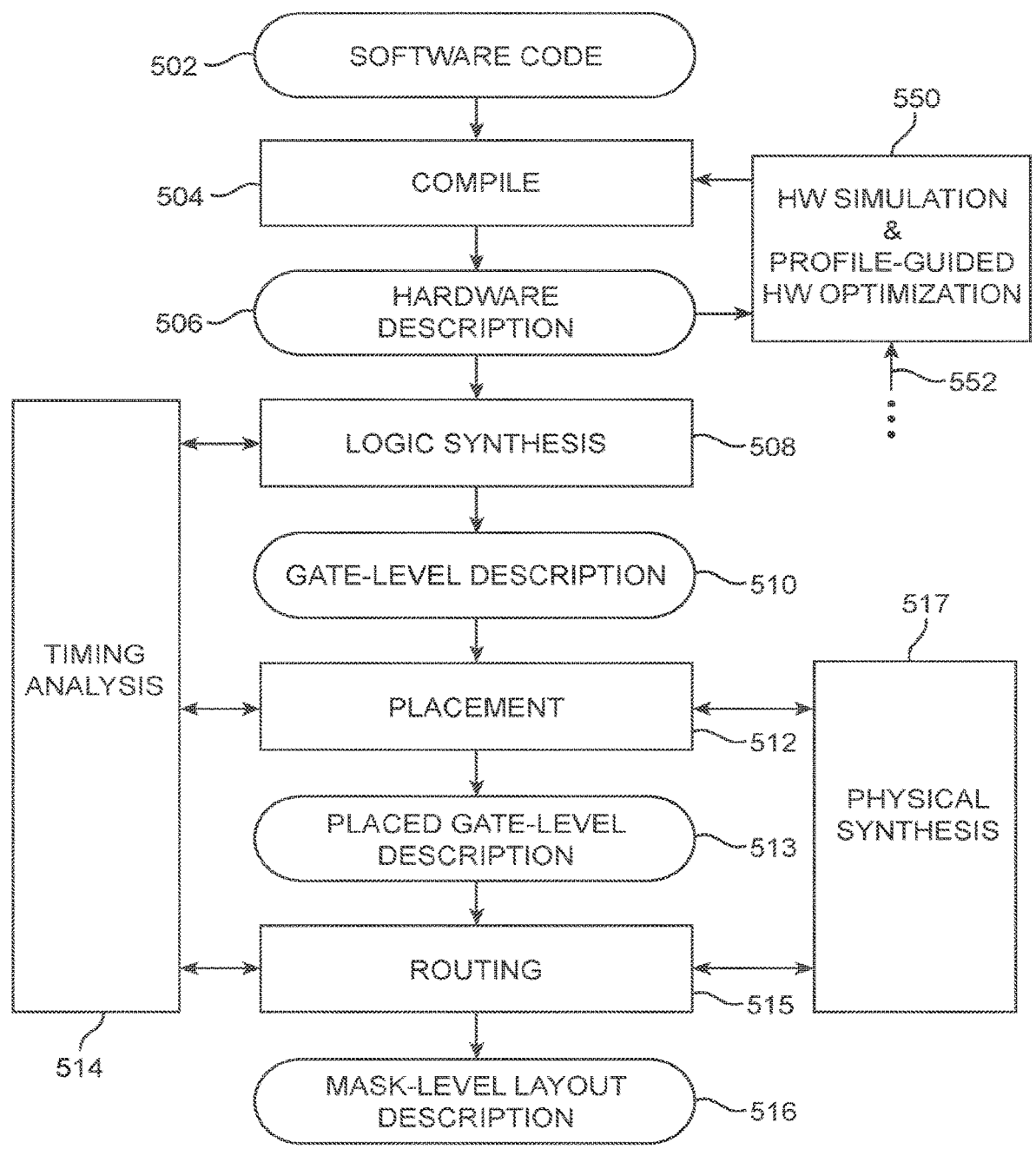
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. A circuit designer may first provide a design specification. The design specification may, in general, be a behavioral description provided in the form of a software application source code 502 (e.g., C code, C++ code, SystemC code, OpenCL code, etc.).

At step 504, tools 420 may compile source code 502 via a process sometimes referred to as behavioral synthesis or algorithmic synthesis to convert code 502 into a hardware description 506. Hardware description 506 may (as an example) be a register transfer level (RTL) description. The RTL description may have any form of describing circuit functions at the register transfer level. For example, the RTL description may be expressed using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL).

In general, code 502 may include untimed or partially timed functional code (i.e., the application code does not describe cycle-by-cycle hardware behavior), whereas the hardware description 506 may include a fully timed design description that details the cycle-by-cycle behavior of the circuit at the register transfer level.

Code 502 and/or hardware description 506 may also include target criteria such as area use, power consumption, delay minimization, clock frequency optimization, or any combination thereof. The optimization and target criteria may be collectively referred to as constraints.

Those constraints can be provided for individual data paths, portions of individual data paths, portions of a design, or for the entire design. For example, the constraints may be provided with code 502, description 506, in a constraint file, or through user input (e.g., using the design and constraint entry tools 464 of FIG. 4), to name a few.

During step 508, logic synthesis operations may generate gate-level description 510 from hardware description 506 using logic synthesis and optimization tools 474 (FIG. 4). The output of logic synthesis 508 is a gate-level description 510 of the design.

During step 512, placement operations using placement tools 476 of FIG. 4 may place the different gates in gate-level description 510 in a preferred location on the targeted integrated circuit to meet given target placement criteria (e.g., to minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target routing criteria (e.g., to minimize congestion, minimize path delay and maximize clock frequency, satisfy minimum delay requirements, or any combination thereof). The output of routing 515 is a mask-level layout description 516 (sometimes referred to as routed gate-level description 516).

While placement and routing is being performed at steps 512 and 515, physical synthesis operations 517 may be concurrently performed to further modify and optimize the circuit design (e.g., using physical synthesis tools 476 of FIG. 4).

In accordance with an embodiment, hardware (HW) simulation and profile-guided optimization operations may be performed at step 550 to simulate the functionality of hardware description 506. If the functionality of hardware description 506 is incomplete, incorrect, or can further be optimized based on the simulation results, the circuit designer can make changes to the software code 502 or the hardware description 506. The example of FIG. 5 in which step 550 is shown as an iterative feedback loop with hardware description 506 as an input is merely illustrative. If desired, the HW simulation and profile-guided HW optimization operations can also be performed at any other level of the overall design flow of FIG. 5, as shown by feedback path 552 (e.g., step 550 may also be performed on gate-level description 510, placed gate-level description 513, mask-level layout description, etc.).

Figure 6:
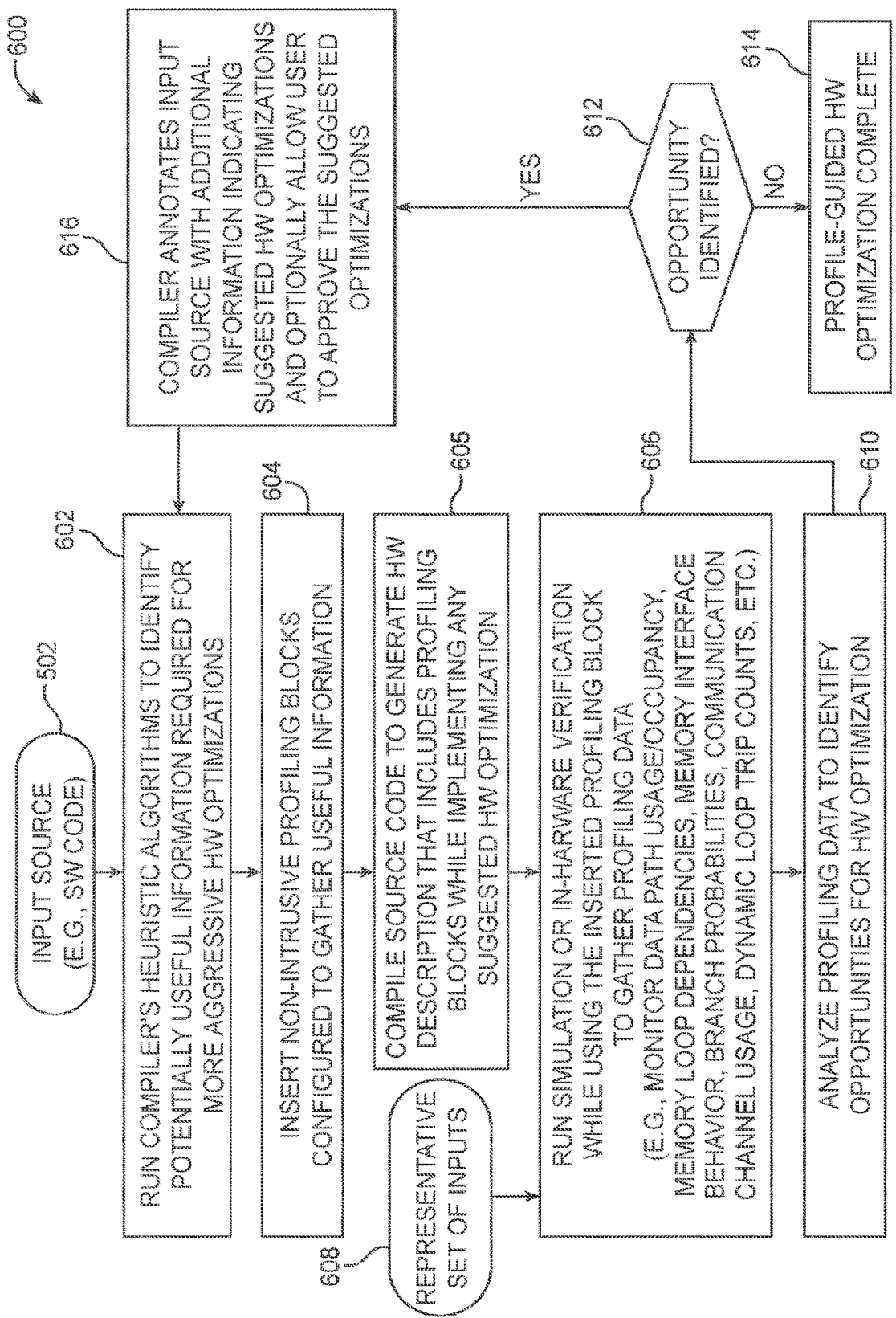
FIG. 6 is a flow chart of illustrative steps for performing simulation or in-hardware verification and profiled-guided hardware optimization in accordance with an embodiment.

FIG. 6 is a flow chart 600 of illustrative steps for performing simulation or in-hardware verification and profiled-guided hardware optimization. At step 602, a compiler (which may be part of CAD tools 420 of FIG. 4 that is used to perform step 504 of FIG. 5) may receive input source 502 (e.g., a software code, a source code, an application code, etc.) and may use heuristic algorithms to identify potentially useful information that is required for more aggressive hardware optimizations.

At step 604, non-intrusive profiling blocks that are configured to gather the potentially useful information identified by the compiler may be inserted into the hardware description. These profiling blocks may be inserted into the hardware for simulation purposes only (e.g., the final integrated circuit does not actually include any profiling blocks). Alternatively, the inserted profiling blocks may remain in the synthesized hardware so that profiling data can be gathered while the design is running on the silicon (e.g., the final integrated circuit die will include the profiling blocks formed in silicon). Profiling blocks configured in this way is said to perform "in-hardware verification."

Figure 7:
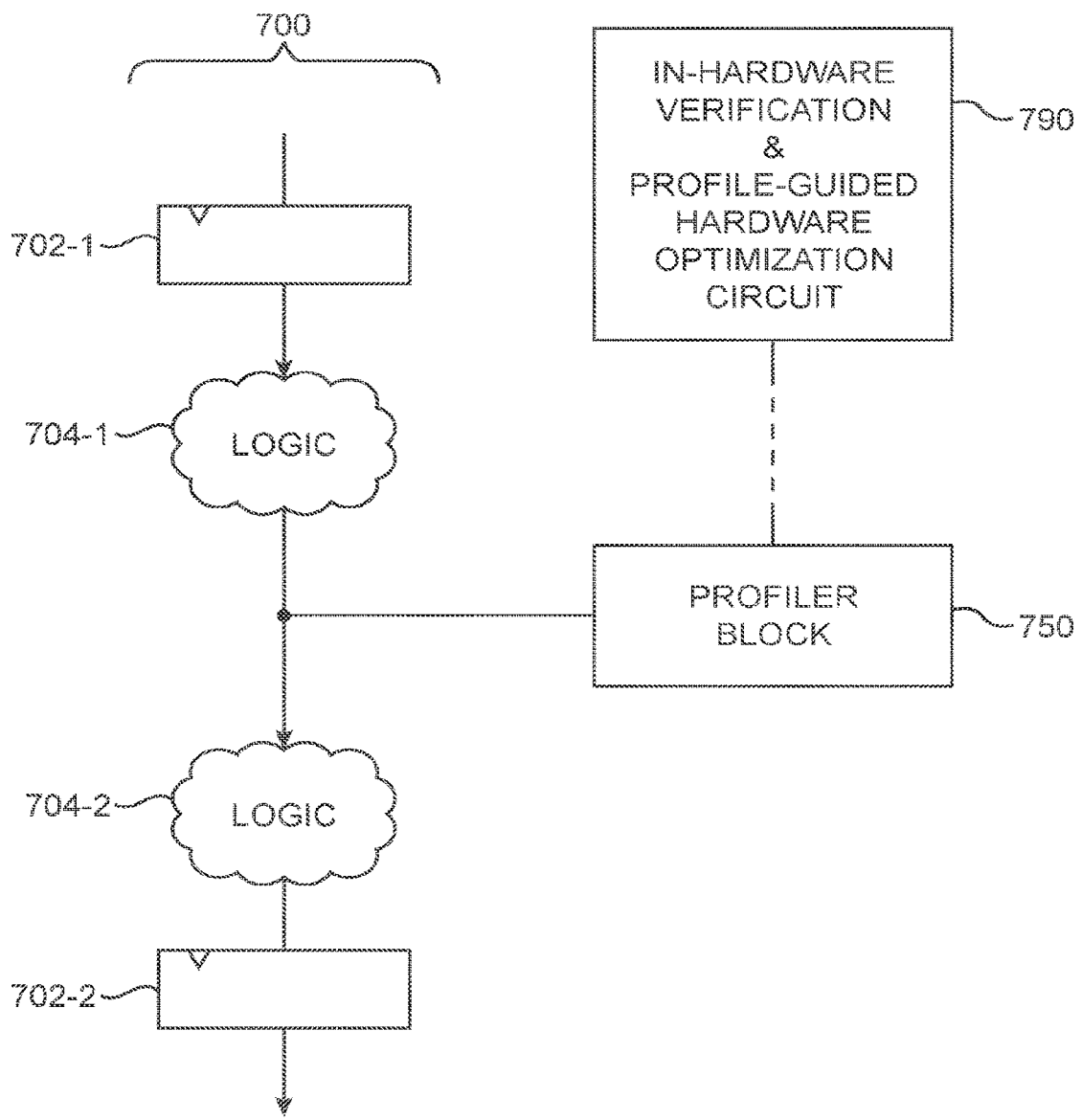
FIG. 7 is a diagram illustrating how a non-intrusive profiler block can be inserted in a data path in accordance with an embodiment.

FIG. 7 is a diagram illustrating how a profiler block such as profiler block 750 can be non-intrusively inserted in a data path 700. As shown in FIG. 7, data path 700 may include logic components 704-1 and 704-2 interposed between data register 702-1 and data register 702-2. Profiler block 750 may be configured to tap or probe the node between logic components 704-1 and 704-2 to monitor and analyze the dynamic behavior of signals passing through data path 700. Connected in this way, profiler block 750 merely observes and measures signal waveforms without actually affecting the functionality or structure of the hardware design.

The example of FIG. 7 in which profiling block 750 is attached to data path 700 is merely illustrative. In general, one or more profiling blocks may be non-intrusively inserted into any point(s) of interest in a logic circuit, an arithmetic circuit, a pipelined circuit, a memory/storage circuit, a memory interface circuit, a data bus, a communications channel, etc. Profiling block 750 may be inserted for simulation purposes only or may remain permanently in the silicon such that profiling data may be gathered during normal operation of device 10. In the arrangement where profiling block 750 remains as part of the final silicon, the integrated circuit may also include an in-hardware verification and profile-guided hardware optimization circuit such as circuit 790 that is coupled to one or more profiling blocks 750. Circuit 790 may be configured to analyze the data gathered by block 750 and to further optimize the existing hardware design of the integrated circuit (e.g., by reducing the resource usage of the existing hardware design or by speeding up the existing hardware design).

Referring back to FIG. 6, the compiler may then compile the software code to generate a hardware description that includes the inserted profiling blocks while implementing any suggested hardware optimizations (step 605). The suggested hardware optimizations may be provided by the iterative feedback loop at step 616, which will be described in detail below.

At step 606, tools 420 may then perform simulation on the hardware description or in-hardware verification (e.g., using circuit 790 of FIG. 7) to observe the behavior of the hardware. The simulation or the actual hardware may receive a representative set of inputs 608 that is provided by the user/designer. Inputs 608 represent only a predetermined subset of all possible inputs that can be received by the circuit design and leaves out input patterns or sequences that are unlikely or never to occur in practice when operating the circuit design. By simulating or verifying dynamic behavior of the hardware using a representative set of inputs 608, optimization can be better tailored to the specific application and its intended operational scheme.

During the simulation/verification of step 606, the inserted profiling blocks will gather or log profiling data (e.g., the profiling blocks or "hooks" may monitor data path usage/occupancy, memory loop dependencies, memory interface behavior, branch probabilities, communication channel usage, dynamic loop trip counts, etc.). At step 610, tools 420 may be configured to analyze the profiling data and identify opportunities for hardware optimization. If at least one opportunity for hardware optimization has been identified, processing will proceed to step 616.

At step 616, the compiler may annotate the input source code (i.e., the software code or application code) with additional information indicating the suggested hardware optimizations. The user/designer may optionally approve the suggested hardware optimizations (e.g., the user is provided with an opportunity to approve any hardware updates). Processing may then loop back to step 602 to perform the next iteration to generate an updated hardware description implementing the suggested hardware optimizations. This iterative loop may be performed as many times as necessary until no additional opportunity for HW optimization has been identified (or until the point at which the marginal benefit is negligible). At this point 614, the profile-guided hardware optimization is complete.

These steps are merely illustrative and are not intended to limit the present embodiments. The existing steps may be modified or omitted, some of the steps may be performed in parallel; additional steps may be added, and the order of certain steps may be reversed or altered. For example, these steps can be performed at any level of the overall design flow shown in FIG. 5 to obtain more aggressive hardware optimizations.

In general, the information being gathered by the profiling blocks may include data that can potentially help simplify the actual hardware of the circuit design. As an example, a profiling block may monitor a 32-bit data path and discover that only 16 bits are actively used. In such scenarios, the width of the data path can be reduced. As another example, a profiling block may determine the branch probabilities of an if-else branch. If one branch occurs much more frequently than another (e.g., if one branch occurs at least two times more frequently, at least four times more frequently, at least eight times more frequently, etc.), then the seldom-used branch can be made smaller or slower.

As another example, a profiling block may monitor loop dependencies in memory access operations. In practice, problems may arise when loading stored data from an address that is empty or contains the wrong stored data because of memory dependencies. For example, memory dependencies may occur when executing instructions relating to iterations of a loop, such as when a given iteration of the loop depends on the result of a previous iteration of the loop. In other words, the load operation of a given iteration of the loop may depend on the completion of the store operation of a previous iteration in the loop.

Figure 8:
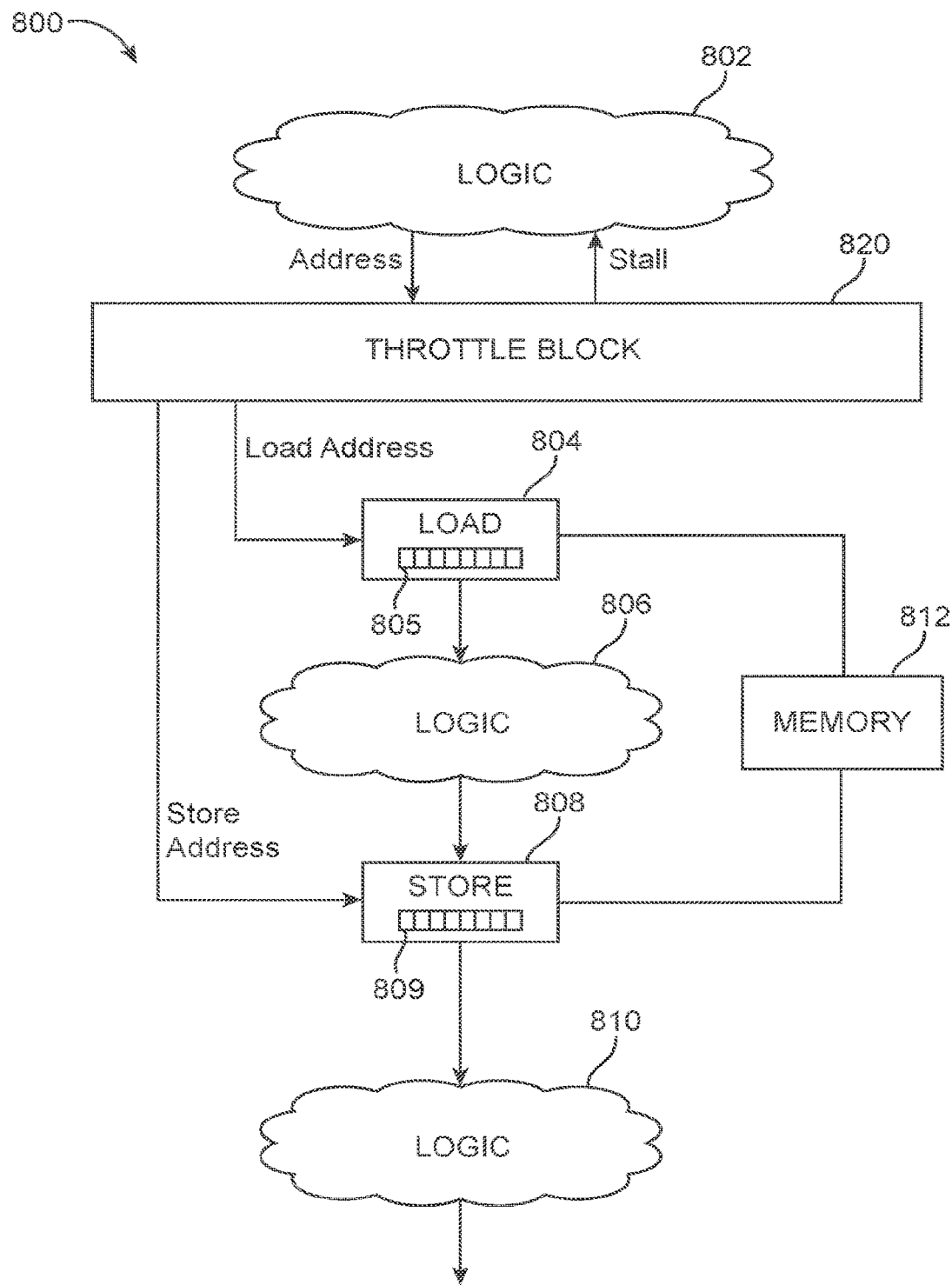
FIG. 8 is a diagram of a data path with potential loop dependencies in accordance with an embodiment.

Because the dynamic memory dependency problem relates to loading data from an address that has yet to have the proper data stored, a data path may include throttling circuitry that monitors all of the stored addresses that have recently been written into. FIG. 8 shows a data path 800 with potential loop dependencies in accordance with an embodiment. As shown in FIG. 8, data path 800 may include logic 802 (sometimes referred to herein as a compute block) that receives an input into data path 800 during runtime. Logic 802 may generate a load address for a memory loading circuit such as load block 804 and a store address for a memory storing circuit such as store block 808 based on the received input. Load block 804 may include a first-in first-out (FIFO) circuit 805, whereas store block 808 may include a FIFO circuit 809.

Data path 800 may include a core portion that includes load block 804, logic 806, and store block 808. The core portion of data path 800 may relate to stages that execute the steps to be completed in order to finish executing the threads received by data path 800. Store block 808 may feed into downstream logic 810. Load block 804 and store block 808 may be coupled to memory 812 (e.g., a variable-latency memory, dynamic random-access memory, etc.). In the example of FIG. 8, a throttle block 820 may be interposed between logic 802 and the core portion of data path 300. Throttling block 820 may include a dependency detection circuit that maintains a store address history table of in-flight store addresses. A store address may be considered "in-flight" after it has been received as an input and before it is cleared. The store address is cleared after store block 808 successfully stores the corresponding data to the store address. In other words, the list of in-flight store addresses stored in the history table represent store addresses that are at risk of raising memory dependency issues.

Throttle block 820 may also receive load addresses. The load addresses may be used as look-up values to check against address entries in the store address history table for memory dependency issues (e.g., to detect for load/store conflicts or read/write collisions). In particular, if a load address (i.e., a look-up address) collides with an in-flight store address entry in the history table, then block 820 may trigger (e.g., enable or assert) a stall signal to any circuitry upstream from the core portion of data path 800. If there is no match between a look-up load address and any in-flight store addresses in the history table, processing in data path 800 may proceed as normal (e.g., the stall signal is not asserted). In general, the profiling blocks may measure a stall percentage indicative of how often a data path is being throttled.

In the example of FIG. 8, profiling blocks may be inserted to monitor the load and store address to determine how often a stall or memory loop dependency issues occur. If memory dependency issues never occur, then the dependency can be broken by further pipelining the data path or by removing the throttling block. The memory loop dependency problem also arises for data paths that support read-modified-write scenarios. Thus, the present embodiments can help optimize hardware configured to perform read-modified-write operations.

This example in which profiling blocks are used to monitor memory loop dependencies is merely illustrative and is not intended to limit the scope of the present embodiments. In general, profiling blocks may be inserted to observe and measure other types of memory contention, memory latency, memory access pattern, or other types of memory interface behavior. As yet other examples, profiling blocks may be inserted to monitor dynamic loop trip counts (e.g., to monitor the number of iterations performed by each nested for loop), communications channel usage (e.g., to monitor the fill level of an input or output FIFO to determine the optimal size/depth that is necessary for proper ingress and egress), etc.

An integrated circuit design generated in this way may reflect smaller and faster hardware that is better suited to the application. Hardware improvements and optimizations that can be achieved may include more aggressive hardware folding (e.g., time sharing of hardware resources), more efficient sizing and sharing of inter-block communications (e.g., smaller memory blocks and FIFOs), coalescing of load-store units (e.g., two different groups of load and store blocks may be merged into a single group if they don't perform conflicting accesses), partitioning of memory blocks to achieve a higher level of parallelism, etc.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

EXAMPLES

The following examples pertain to further embodiments.

Example 1 is a method of using circuit design tools running on computing equipment to implement an integrated circuit, the method comprising: receiving a source code; compiling the source code to generate a hardware description for the integrated circuit, wherein the hardware description includes profiling blocks; simulating the hardware description so that the profiling blocks can gather profiling data; analyzing the profiling data to identify opportunities for hardware optimization; and updating the source code based on the identified opportunities for hardware optimization to generate a smaller hardware design for the integrated circuit.

Example 2 is the method of example 1, wherein the profiling blocks are optionally configured to monitor data path usage.

Example 3 is the method of example 1, wherein the profiling blocks are optionally configured to identify memory loop dependencies.

Example 4 is the method of example 1, wherein the profiling blocks are optionally configured to monitor memory interface behavior.

Example 5 is the method of example 1, wherein the profiling blocks are optionally configured to monitor communications channel usage.

Example 6 is the method of example 1, wherein the profiling blocks are optionally configured to compute branch probabilities.

Example 7 is the method of any one of examples 1-6, wherein the profiling blocks are optionally non-intrusively inserted for simulation purposes only.

Example 8 is the method of any one of examples 1-6, wherein simulating the hardware description optionally comprises simulating the hardware description using a representative set of inputs.

Example 9 is the method of any one of examples 1-6, optionally further comprising: using heuristic algorithms to identify useful information required for additional hardware optimizations; and gathering the useful information using the profiling blocks.

Example 10 is the method of any one of examples 1-6, optionally further comprising: presenting a user with an opportunity to approve the updating of the source code.

Example 11 is an integrated circuit, comprising: circuitry having a given hardware design; and a profiling block that is coupled to the circuitry and that is used to gather data on the circuitry, wherein the given hardware design of the circuitry is updated based on the data gathered by the profiling block.

Example 12 is the integrated of example 11, wherein the updated hardware design optionally uses fewer logic resources than the given hardware design.

Example 13 is the integrated of example 11, wherein the updated hardware design is optionally faster than the given hardware design.

Example 14 is the integrated of any one of examples 11-13, wherein the hardware design is optionally verified by feeding a representative set of input values to the circuitry.

Example 15 is the integrated of any one of examples 11-13, further optionally comprising: an in-hardware verification and profile-guided hardware optimization circuit that is configured to optimize the given hardware design to generate the updated hardware design.

Example 16 is a non-transitory computer-readable storage medium comprising instructions for: receiving a software code for implementing an integrated circuit; compiling the software code to output a hardware code; simulating the hardware code to obtain simulation results; and annotating the software code based on the simulation results, wherein the annotated software code implements a faster and smaller design for the integrated circuit.

Example 17 is the non-transitory computer-readable storage medium of example 16, optionally further comprising instructions for: using heuristic algorithms to identify potentially useful information required for more aggressive hardware optimizations.

Example 18 is the non-transitory computer-readable storage medium of example 17, optionally further comprising instructions for: inserting non-intrusive profiling hooks into the software code to gather the potentially useful information.

Example 19 is the non-transitory computer-readable storage medium of example 18, optionally further comprising instructions for: analyzing the information gathered by the profiling blocks to identify additional opportunities for hardware optimization.

Example 20 is the non-transitory computer-readable storage medium of example 19, optionally further comprising instructions for: allowing a user to approve a suggested hardware optimization selected from the additional opportunities for hardware optimization.

Example 21 is integrated circuit design tools for implementing an integrated circuit, comprising: means for receiving a source code; means for compiling the source code to generate a hardware description for the integrated circuit, wherein the hardware description includes profiling blocks; means for simulating the hardware description so that the profiling blocks can gather profiling data; means analyzing the profiling data to identify opportunities for hardware optimization; and means for updating the source code based on the identified opportunities for hardware optimization to generate a smaller hardware design for the integrated circuit.

Example 22 is the integrated circuit design tools of example 21, wherein the profiling blocks are optionally configured to: monitor data path usage; identify memory loop dependencies; monitor memory interface behavior; monitor communications channel usage; or compute branch probabilities.

Example 23 is the integrated circuit design tools of example 21, wherein the profiling blocks are optionally non-intrusively inserted for simulation purposes only.

Example 24 is the integrated circuit design tools of example 21, wherein the profiling blocks are optionally permanently inserted into the integrated circuit.

Example 25 is the integrated circuit design tools of any one of examples 21-24, wherein the means for simulating the hardware description optionally comprises means for simulating the hardware description using a representative set of inputs.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A method, comprising:
   receiving source code to implement a function in a programmable logic device;
   compiling the source code to generate a hardware description for the implementation, wherein the hardware description includes profiling blocks to enable profiling of the implementation;
   receiving input data;
   executing the function using the hardware description and the received input data while capturing profiling data, wherein the profiling data comprises:
      monitored usage of device traces using the profiling blocks, wherein the monitored usage of device traces comprises monitored usage of traces of the programmable logic device by analyzing signals to pass through the device traces; and
      monitored stall issues; and
   providing a suggestion, via a display, to enable a user to approve a suggested hardware optimization to provide a more optimized implementation of the function based at least in part on the profiling data.

2. The method of claim 1, wherein the source code comprises OpenCL, C, or C++ programming languages.

3. The method of claim 1, wherein the hardware description comprises a register-transfer-level-based hardware description language.

4. The method of claim 3, wherein the register-transfer-level-based hardware description language comprises Verilog or Very High Speed Integrated Circuit Hardware Description Language (VHDL).

5. The method of claim 1, wherein the profiling data comprises dependent execution of loops.

6. The method of claim 1, wherein the profiling data comprises latency information for the implementation.

7. The method of claim 1, wherein the profiling data comprises area usage for the implementation.

8. The method of claim 1, wherein the profiling data comprises power consumption for the implementation.

9. The method of claim 1, comprising updating the implementation based at least in part on the profiling data to generate a more optimized implementation of the function.

10. The method of claim 9, wherein updating the implementation comprises updating the source code to include indications of the more optimized implementation.

11. The method of claim 9, wherein updating the implementation comprises updating the hardware description to include indications of the more optimized implementation.

12. The method of claim 1, comprising analyzing the profiling data to identify opportunities for hardware optimization in implementing the function, wherein the suggestion is based at least in part on identified opportunities.

13. The method of claim 12, wherein the identified opportunities comprise increasing optimization for a target clock frequency.

14. The method of claim 12, wherein the identified opportunities comprise increased throughput performance.

15. The method of claim 1, wherein the profiling data comprises monitored memory interface behavior.

16. The method of claim 1, wherein the profiling data comprises monitored communications channel usage.

17. The method of claim 1, wherein the profiling blocks are inserted for simulation purposes.

18. The method of claim 1, wherein executing the function comprises simulating the function in software.

19. The method of claim 1, wherein executing the function comprises simulating the function using in-hardware verification, and the profile blocks comprise profile block circuitry implemented for the in-hardware verification.

20. The method of claim 1, wherein updating the implementation is based at least in part of received input from a user.

21. The method of claim 1, wherein the suggestion comprises a suggestion to change a width of at least one of the device traces based in part on the analyzation of the signals showing that some bandwidth is not or will not be used.

22. Non-transitory, computer-readable medium having stored thereon instructions that, when executed by a processors, are to cause the processor to:
   receive source code to implement a function in a programmable logic device;
   compile the source code to generate a hardware description for the implementation, wherein the hardware description includes profiling blocks to enable profiling of the implementation;
   receive input data;
   execute the function using the hardware description and the received input data while capturing profiling data, wherein the profiling data comprises:
      monitored usage of device traces using the profiling blocks, wherein the monitored usage of device traces comprises monitored usage of traces of the programmable logic device by analyzing signals to pass through the device traces; and
      monitored stall issues; and
   providing a suggestion, via a display, to enable a user to approve a suggested hardware optimization to provide a more optimized implementation of the function based at least in part on the profiling data.

23. The non-transitory, computer-readable medium of claim 22, wherein the source code comprises OpenCL, C, or C++ programming languages.

24. The non-transitory, computer-readable medium of claim 22, wherein the hardware description comprises a register-transfer-level-based hardware description language.

25. The non-transitory, computer-readable medium of claim 24, wherein the register-transfer-level-based hardware description language comprises Verilog or Very High Speed Integrated Circuit Hardware Description Language (VHDL).

26. The non-transitory, computer-readable medium of claim 22, wherein the profiling data comprises dependent execution of loops.

27. The non-transitory, computer-readable medium of claim 22, wherein the profiling data comprises latency information for the implementation.

28. The non-transitory, computer-readable medium of claim 22, wherein the profiling data comprises area usage for the implementation.

29. The non-transitory, computer-readable medium of claim 22, wherein the profiling data comprises power consumption for the implementation.

30. The non-transitory, computer-readable medium of claim 22, wherein the instructions when executed are to cause the processor to update the implementation based at least in part on the profiling data to generate a more optimized implementation of the function.

31. The non-transitory, computer-readable medium of claim 30, wherein updating the implementation comprises updating the source code to include indications of the more optimized implementation.

32. The non-transitory, computer-readable medium of claim 30, wherein updating the implementation comprises updating the hardware description to include indications of the more optimized implementation.

33. The non-transitory, computer-readable medium of claim 22, wherein the suggestion is based at least in part on an opportunity for increasing optimization for a target clock frequency.

34. The non-transitory, computer-readable medium of claim 22, wherein the suggestion is based at least in part on an opportunity for increased throughput performance.

35. The non-transitory, computer-readable medium of claim 22, wherein the profiling data comprises monitored memory interface behavior.

36. The non-transitory, computer-readable medium of claim 22, wherein the profiling data comprises monitored communications channel usage.

37. The non-transitory, computer-readable medium of claim 22, wherein the profiling blocks are inserted for simulation purposes.

38. The non-transitory, computer-readable medium of claim 22, wherein executing the function comprises simulating the function in software.

39. The non-transitory, computer-readable medium of claim 22, wherein executing the function comprises simulating the function using in-hardware verification, and the profile blocks comprise profile block circuitry implemented for the in-hardware verification.

40. The non-transitory, computer-readable medium of claim 22, wherein the suggestion comprises a suggestion to change a width of at least one of the device traces based in part on the analyzation of the signals showing that some bandwidth is not or will not be used.

41. A system, comprising:
a programmable logic device;
a processor that, when executing instructions, is to:
receive source code to implement a function in the programmable logic device;
compile the source code to generate a hardware description for the implementation, wherein the hardware description includes profiling blocks to enable profiling of the implementation;
receive input data;
execute the function using the hardware description and the received input data while capturing profiling data, wherein the profiling data comprises:
monitored usage of device traces using the profiling blocks, wherein the monitored usage of device traces comprises monitored usage of traces of the programmable logic device by analyzing signals to pass through the device traces; and
monitored stall issues; and
provide a suggestion, via a display, to enable a user to approve a suggested hardware optimization to provide a more optimized implementation of the function based at least in part on the profiling data.

42. The system of claim 41, wherein the source code comprises OpenCL, C, or C++ programming languages.

43. The system of claim 41, wherein the hardware description comprises a register-transfer-level-based hardware description language.

44. The system of claim 43, wherein the register-transfer-level-based hardware description language comprises Verilog or Very High Speed Integrated Circuit Hardware Description Language (VHDL).

45. The system of claim 41, wherein the profiling data comprises dependent execution of loops.

46. The system of claim 41, wherein the profiling data comprises latency information for the implementation.

47. The system of claim 41, wherein the profiling data comprises area usage for the implementation.

48. The system of claim 41, wherein the profiling data comprises power consumption for the implementation.

49. The system of claim 41, wherein the processor when executing the instructions is to update the implementation based at least in part on the profiling data to generate a more optimized implementation of the function.

50. The system of claim 49, wherein updating the implementation comprises updating the source code to include indications of the more optimized implementation.

51. The system of claim 49, wherein updating the implementation comprises updating the hardware description to include indications of the more optimized implementation.

52. The system of claim 41, wherein the processor is to analyze the profiling data to identify opportunities for hardware optimization in implementing the function, wherein the suggestion is based at least in part on identified opportunities.

53. The system of claim 52, wherein the identified opportunities comprise increasing optimization for a target clock frequency.

54. The system of claim 52, wherein the identified opportunities comprise increased throughput performance.

55. The system of claim 41, wherein the profiling data comprises monitored memory interface behavior.

56. The system of claim 41, wherein the profiling data comprises monitored communications channel usage.

57. The system of claim 41, wherein the profiling blocks are inserted for simulation purposes.

58. The system of claim 41, wherein executing the function comprises simulating the function in software.

59. The system of claim 41, wherein executing the function comprises simulating the function using in-hardware verification, and the profile blocks comprise profile block circuitry implemented for the in-hardware verification.

60. The system of claim 41, wherein updating the implementation is based at least in part of received input from a user.

61. The system of claim 41, wherein the suggestion comprises a suggestion to change a width of at least one of the device traces based in part on the analyzation of the signals showing that some bandwidth is not or will not be used.

* * * * *